Figure 1:
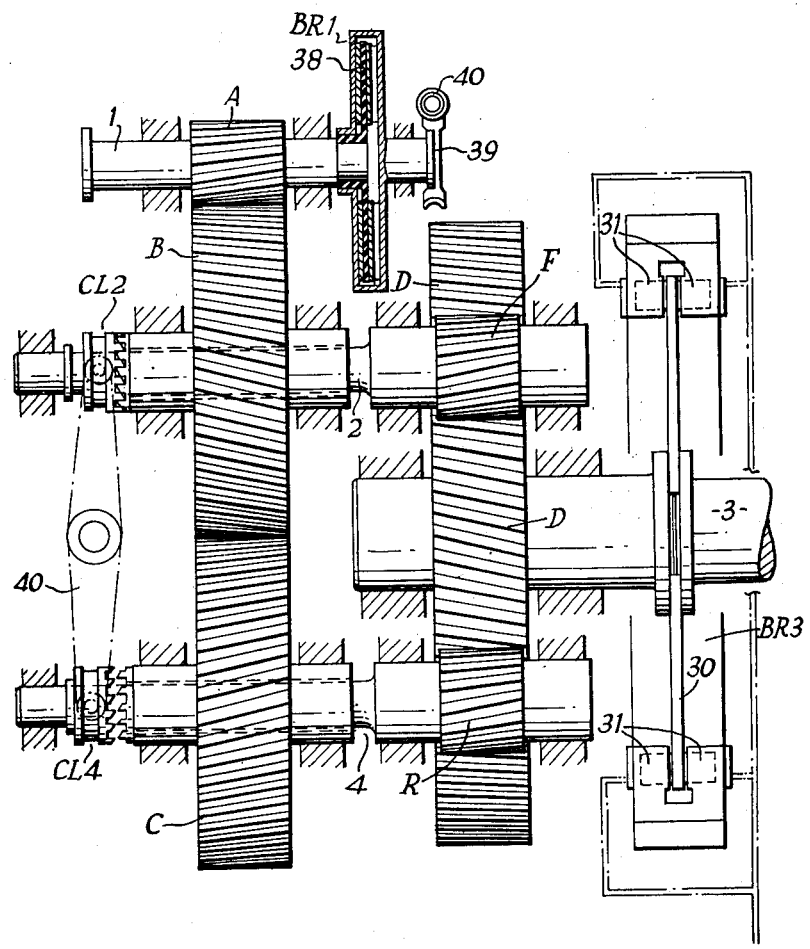

March 7, 1961  H. SINCLAIR  2,973,845
MARINE PROPULSION SYSTEMS
Filed June 12, 1958  3 Sheets-Sheet 1

INVENTOR
Harold Sinclair
BY
Benjamin Sweedler
ATTORNEY

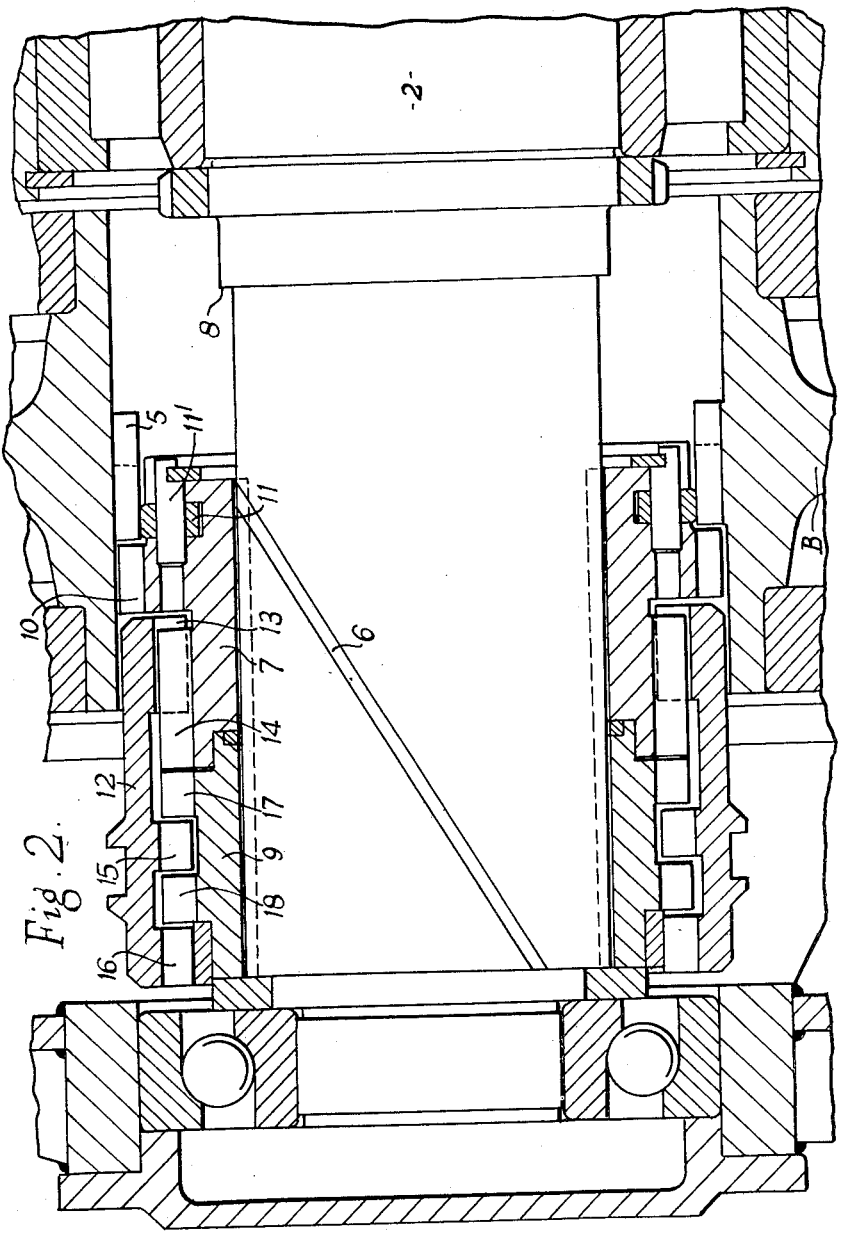

March 7, 1961 H. SINCLAIR 2,973,845
MARINE PROPULSION SYSTEMS
Filed June 12, 1958 3 Sheets-Sheet 3
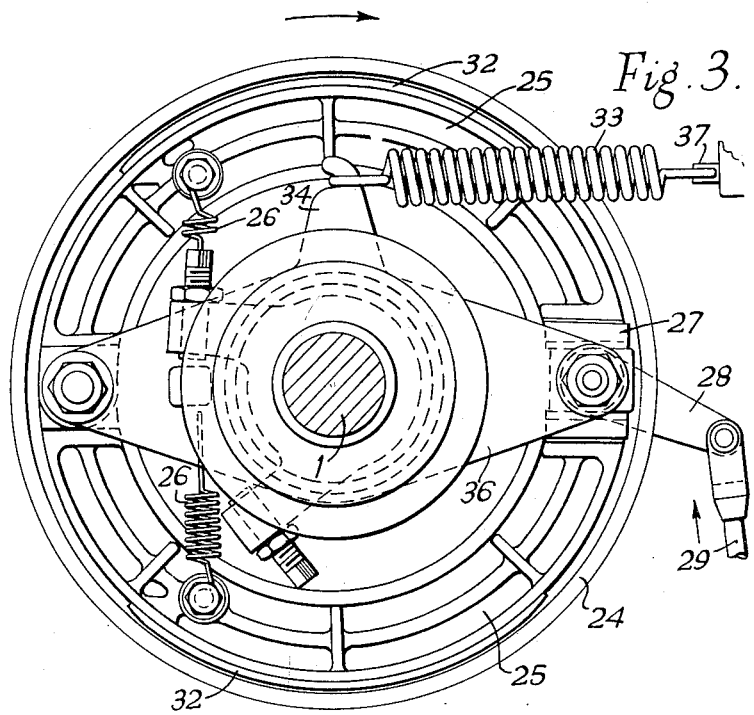
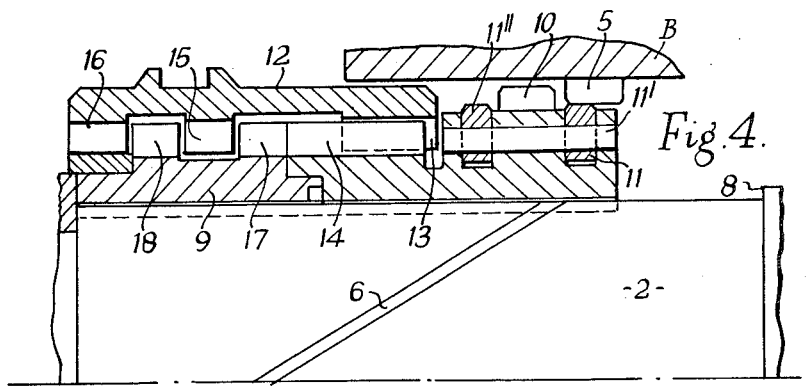
INVENTOR
Harold Sinclair
BY
Benjamin Sweedler
ATTORNEY 002,973,845
Patented Mar. 7, 1961

2,973,845
MARINE PROPULSION SYSTEMS

Harold Sinclair, Windsor, England
(5 Phillimore Gardens Close, London W. 8, England)

Filed June 12, 1958, Ser. No. 741,495

Claims priority, application Great Britain June 14, 1957

3 Claims. (Cl. 192—4)

This invention relates to marine propulsion systems in which provision is made for selectively driving the propeller in ahead or astern sense, with a prime mover intended for unidirectional rotation when in normal operation. The prime mover may be a steam or gas turbine or may be a diesel engine driving through a hydraulic turbo coupling.

Such a transmission may include two power paths and associated gearing together with two positive clutches whereby the output shaft coupled to the propeller may be rotated in one direction or the other relative to the input shaft coupled to the prime mover, the said clutches being of a type wherein clutch engagement involves a helical movement of one clutch element relative to another clutch element upon back-turning of the said input shaft and wherein locking control means are provided for selectively locking one or other clutch in the engaged condition.

United States Patent No. 2,252,042 describes reversing gearing of such a type comprising a forward-drive transmission path in parallel with a reverse-drive transmission path between an input shaft and an output shaft, each of said paths including an "inverted" synchronising clutch. The inverted synchronising clutches are each of the type comprising a toothed first member, a second member rotatable relatively to first member, a toothed intermediate member movable helically with respect to said second member, and means for effecting synchronous engagement of the teeth of said first and intermediate members. Each clutch is, moreover, provided with means for locking it in the engaged condition. The gearing is provided with a back-turning mechanism that can be applied to the input shaft to stop the shaft and gears and rotate the input shaft backwards through an angle sufficient to bring the gearing to a condition in which both of the synchronising clutches are drawn into engagement, following which one or other clutch according to the required driving direction, can be locked by a control sleeve in the drivably engaged condition.

This arrangement would not be satisfactory if applied without modification to marine propulsion systems at high power since the brake mechanism shown in Fig. 1 of United States Patent No. 2,252,042 would not be suitable for overcoming the stalled drag torque of the constant filling type turbo coupling illustrated plus the overrunning torque due to the propeller of a vesesl of substantial size, e.g. of several hundred tons and upwards in weight; particularly when the vessel is under way at a relatively high speed.

The invention relates to any type of clutch which requires back-turning of the input element relative to the non-rotating output element to achieve the at least partial or initial engagement of the clutch.

In United States Patent No. 2,252,042 the means for effecting engagement of the said clutches comprise pawls carried by the intermediate member of the clutch and co-operating with the teeth of the first member of the clutch. In the normal direction of rotation of the first and second members of the clutch the intermediate member (if unlocked), is moved to a disengaged position by the application of driving torque to the input shaft. Conversely, under a reversal of the torque the intermediate member is moved by the action of the pawls from the disengaged to an engaged position. With the described arrangement of two parallel transmission paths, it will ordinarily happen that when the mechanism for stopping and then back-turning the input shaft is applied to stop the input shaft (the output shaft and associated gearing then also being stopped by the said brake) the pawls of the respective clutches are not at that moment similarly disposed in angular sense with respect to the teeth of their associated first clutch members, and that when upon back-turning of the input shaft a pawl of one clutch is engaged by a tooth of its first member the pawls of the other clutch will ordinarily be spaced away, in angular sense, from the teeth of their associated first clutch member. It would be most exceptional when the shafts are stopped for the pawls and associated teeth of the clutch members to have stopped in precisely identical angular relationships such that backward turning of the input shaft would cause both clutches to be drawn simultaneously into engagement with the respective clutch teeth.

Since the axial movements of the intermediate members in the engaging direction are limited by stops, a situation may arise in which only one of the clutches is engaged, being up against its stop, and the other clutch is incapable of engaging since further backward turning of the input shaft and associated forward and reverse drive gears is prevented by the stop of the engaged clutch, having regard to the circumstance that the secondary shaft system and propeller is at rest and the torque required to turn it backwards is beyond the capacity of the back-turning brake when such reversing gearing is used for higher power marine propulsion, and in this event it is desirable to provide also a powerful brake on the output shaft (or on a shaft geared for rotation therewith) to overcome or assist in overcoming the torque due to the propeller over-running while the vessel continues in motion. In this case the output shaft brake will prevent backward-turning of the gear shaft system by means of the back-turning mechanism, in the above-described conditions wherein backward-turning to the full extent is essential for drawing the two clutches into toothed engagement to permit of selective locking of the ahead or astern clutch.

The foregoing difficulty would arise similarly if the S.S.S. clutches had other means of initiating clutch engagement, e.g. magnetic means as described in United States patent application Serial No. 528,312, now Patent No. 2,876,878 dated March 10, 1959, or axially operating resilient means as disclosed by United States patent application Serial No. 528,309, now Patent No. 2,892,524 dated June 30, 1959.

The object of the invention therefore is to overcome the above-mentioned disadvantage in the use of clutches of the type described and to provide a system suitable for marine propulsion in the higher powers for which a powerful brake associated with an output shaft (which is not necessarily the propeller shaft) is used to stop the shaft system, together with mechanism for turning the input shaft backwards to a sufficient degree to engage both clutches for selective locking thereof.

In accordance with the invention, the construction of the clutches with their locking control means in the above-mentioned type of reversing gearing having a powerful output shaft brake is such that with the output shaft stopped and held from rotation both clutches are capable of movement of the said one clutch element relative to the other, upon backward turning of the input shaft, through a sufficient angular distance to permit selective locking of the clutches for the transmission of driving torque.

In one form of the invention each of the said clutches comprises a toothed first clutch member, a second clutch member and a toothed intermediate member constrained for helical movement relative to said second clutch member, means being provided to move each intermediate member into toothed engagement with its associated first toothed clutch member when the input shaft is rotated backwards, the said intermediate members and/or their associated first clutch members being provided with co-acting teeth of an axial width such that upon operation of the back-turning mechanism either intermeditae member can move axially far enough, whilst remaining in toothed engagement with its associated first clutch member, to permit the other intermediate member to move into toothed engagement with its associated first clutch member to permit of its being locked in engagement therewith.

In another form of the invention each of the clutches comprises a toothed first clutch member, a second clutch member and a toothed intermediate member constrained for helical movement relative to said second clutch member, means being provided to move each intermediate member into toothed engagement with its associated first toothed clutch member when the input shaft is rotated backwards, and wherein the operation of the back-turning mechanism causes at least one of the intermediate members to move axially to a position in which it is out of engagement with its associated first clutch member, and wherein means are provided to effect return of the disengaged intermediate member or members to toothed engagement with the associated first clutch member or members when the said input shaft of the gearing is subsequently rotated in the normal driving direction.

In the accompanying drawings,

Fig. 1 shows diagrammatically the arrangement of gearing and back-turning mechanism in a power transmission system according to the invention, Fig. 2 is a part sectional view on a larger scale than Fig. 1 showing details of one form of clutch that may be employed in a system according to Fig. 1, Fig. 3 is an end view of a back-turning brake, and Fig. 4 is a view similar to Fig. 2, showing an alternative form of clutch.

Referring first to Fig. 1, the power transmission system shown diagrammatically includes an input shaft 1, which may be driven by a steam or gas turbine or by a diesel engine through the intermediary of a hydraulic turbo coupling, of the type for example described in British patent specification No. 493,703. On the input shaft 1 is fixed a pinion A which meshes with a gear wheel B on a forward countershaft 2, on which is fixed a forward pinion F which is in mesh with a gear wheel D fixed on an output shaft 3. The gear wheel B meshes with a gear wheel C on a reverse countershaft 4, on which is fixed a reverse pinion R which also meshes with the gear wheel D on the output shaft 3. Within the gear wheel B is a forward clutch CL2, by which gear wheel B can be selectively clutched to and disengaged from the forward countershaft 2, and within gear wheel C is a reverse clutch CL4, by which gear wheel C can be selectively clutched to and disengaged from the reverse countershaft 4.

With the clutch CL2 engaged and clutch CL4 disengaged, the drive from input shaft 1 to output shaft 3 is in forward direction, via A, B, F and D. With clutch CL2 disengaged and clutch CL4 engaged, the drive from input shaft 1 to output shaft 3 is in the reverse direction via A, B, C, R and D.

The output shaft 3 is provided with a powerful stopping brake BR3 and the input shaft 1 is provided with back-turning mechanism BR1.

Fig. 2 shows the clutch CL2 associated with the gear wheel B and forward countershaft 2. The clutch comprises a ring of internal teeth 5 in the gear wheel B (which forms the first clutch member), helical splines 6 on the countershaft 2 (which form the second clutch member) and an intermediate member 7 which is formed with internal helical splines that are engaged with the splines 6 on the shaft 2. The intermediate member 7 is thereby constrained for helical movement on the shaft 2, the extent of its movement being limited by axial stops formed by a shoulder 8 on the shaft 2 and a toothed sleeve 9 fixed on the shaft 2. The intermediate member 7 is provided with external clutch teeth 10 and carries pawls 11 mounted on pawl pins 11′. In the position shown in Fig. 2, with the gear wheel B rotating in clockwise direction as viewed from the left-hand side of the figure, the clutch teeth 5 ratchet with respect to the pawls 11. If, however, the direction of relative rotation of the gear wheel B is reversed, one or more pawls 11 is or are picked up by clutch teeth 5 and the intermediate member 7 is moved helically along the shaft 2, bringing the clutch teeth 10 of the intermediate member cleanly into engagement with the clutch teeth 5. It will be observed that the clutch teeth 5 are longer than the clutch teeth 10, which remain in engagement with the clutch teeth 5 when the intermediate member 7 moves up to the axial stop 8. The clutch is provided with a locking sleeve 12 which is formed with a ring of internal splines 13 permanently engaged with straight splines 14 on the intermediate member 7, the locking sleeve also being formed with two rings of internal teeth 15 and 16 which, with the clutch disengaged as shown, are spaced axially from rings of locking dogs 17 and 18 on the toothed sleeve 9. When the clutch teeth 10 have moved into, but not beyond, their position of full engagement with the clutch teeth 5 (the right-hand side of teeth 10 having reached the position shown by the broken line $x$ in Fig. 2) the control sleeve 12 can be moved axially to bring its teeth 15 and 16 into engagement with the dogs 17 and 18 respectively thereby locking the clutch in the engaged condition. If the control sleeve 12 is moved back to the position shown, the clutch is unlocked, and forward rotation of the input shaft 1 with clockwise rotation of gear wheel B causes the clutch to disengage, the intermediate member 7 moving back to the position shown in which the teeth 5 ratchet with respect to the pawls 11.

The clutch CL4 between the gear wheel C and the reverse countershaft 4 is similar to the clutch CL2 just described, differing only from it by the helical splines in its intermediate member and on the countershaft 4 being right-handed and the pawls being directed so that when the gear wheel C rotates in clockwise direction as seen from the left in Fig. 1 (due to the input shaft 1 being rotated backwards) the clutch CL4 is engaged, and when the input shaft 1 is rotated forwards with the locking sleeve of clutch CL4 in the unlocking position the clutch disengages and the internal clutch teeth in the gear wheel C ratchet with respect to the pawls of clutch CL4 as the gear wheel C rotates in anticlockwise direction.

The brake BR3 on the output shaft 3 is a powerful disc brake comprising a disc 20 fast on the shaft 3 and friction pads 21 adapted to be urged against the disc 20 by fluid pressure supplied through conduits 22. This break is capable of stopping the propeller shaft 3, and holding it stationary i.e. of resisting its strong tendency to rotate when there is substantial way on the ship.

The back-turning mechanism shown in Fig. 3 is operable to arrest and turn the input shaft 1 in the reverse direction being applied when the output shaft 3 is stationary. It comprises a drum 24 fixed to the shaft 1 carrying the pinion A, and shoes 25 provided with retracting springs 26. A cam 27 is fixed on a lever 28 which is pivotally supported in a spider 36 and is connected via a link 29 to the piston rod of a fluid-pressure servo motor (not shown). When fluid pressure is admitted to the cylinder of the servo motor the link 29 moves in the direction of the arrow and the cam 27 is caused to rotate about its axis and press the friction linings 32 on the shoes 25 against the drum 24. Once the shoes 25 have become firmly applied, the pivotal motion of the cam 27 on its axis ceases and further movement of the piston rod of the servo motor causes the back-turning mechanism and input shaft 1 to turn as a whole, with the spider 36 rocking about the axis of shaft 1 against the action of a return spring 33 connected between a lever 34 on the spider 36 and an anchorage 37.

Assume that the vessel is being driven ahead with the ahead clutch CL2 in its engaged position, in which it is locked by the control sleeve 12. The teeth 10 are in engagement with the left hand parts of the teeth 5 viz. the parts between the left-hand side and the broken line $x$, Fig. 2. The astern clutch CL4 is in a ratchetting or free-wheeling position, being provided with centrifugally tail heavy pawls so that at normal speeds of rotation the pawl tips are retracted from contact with the internal clutch teeth of the gear wheel C.

To change over to astern drive with the vessel moving ahead, the engine fuel control is closed to idling power, and the control sleeves of the clutches CL2 and CL4 are operated so as to unlock the ahead clutch CL2. This may be effected by means of a clutch control lever 40 (Fig. 1) which in practice may actuate the locking sleeves through resilient links and forks that engage grooves in the locking sleeves 12. The brake BR3 is then applied so as to bring the shaft system to rest, and to cause the ahead clutch CL2 to disengage. During this time and until the propeller comes to rest the rotation of the shafts of the gearing keeps the astern clutch CL4 disengaged, and its pawls come into ratchetting engagement with the clutch teeth of gear wheel C shortly before the shaft system stops.

When the output shaft 3 is at rest, the back-turning mechanism BR1 is applied, causing the input shaft 1 to turn backwards (together with the output shaft of the turbine or turbo coupling which is under the idling power condition) and thereby drawing both the ahead clutch CL2 and the astern clutch CL4 into engagement under the action of their respective pawls. When the intermediate member of the astern clutch CL4 has moved far enough for full engagement its locking sleeve is actuated to lock the astern clutch in engagement in readiness for the transmission of driving torque when the normal rotation of the input shaft 1 is resumed after releasing the brakes BR1 and BR3 and re-opening the fuel control of the prime mover.

During engagement of the astern clutch CL4 (assuming the ahead clutch CL2 to have been the first to have a pawl engage an internal clutch tooth and thereby to be the first clutch to be drawn into engagement) the backward turning of the input shaft 1 relative to the stationary output shaft 3 by the back-turning mechanism BR1 causes the intermediate member 7 of the ahead clutch CL2 to move further axially in the same direction (to the right in Fig. 2) the teeth 10 of the intermediate member remaining in engagement with the wide teeth 5. When the astern clutch CL4 has become fully engaged further movement of the intermediate member 7 of the ahead clutch is prevented by the stop formed by the shoulder 8 and further back-turning motion is arrested.

When the input shaft 1 is rotated in the forward direction by the prime mover, and since the astern clutch CL4 is locked for the transmission of driving torque, the propeller shaft 3 commences to be driven in the astern direction. The ahead clutch CL2 being unlocked, its intermediate member moves to the disengaged position as shown in Fig. 3.

The operations for changing back from astern driving to ahead driving are similar.

In another embodiment of the invention, instead of clutches as above described in which the clutch teeth of the intermediate member remain in engagement with abnormally wide teeth when the intermediate member moves beyond its position of full toothed engagement, the clutches are of a form in which the clutch teeth of the intermediate member and the coacting teeth are of normal width.

Fig. 4 shows a clutch of this last-mentioned form, which may be used as the clutch CL2 of Fig. 1. Parts in Fig. 4 corresponding to parts in Fig. 2 have been similarly numbered. It will be seen that the clutch teeth 5 and 10 are of equal width, so that when the back-turning mechanism BR1 is applied during change-over from ahead to astern drive and the intermediate member 7 moves towards the shoulder 8, the clutch teeth 10 pass through and beyond the clutch teeth 5. In order to enable the intermediate member 7 to move back to the left when forward rotation of the input shaft 1 is resumed, a further ring of auxiliary pawls 11' is provided, the noses of which point in the opposite direction to those of the pawls 11. When the intermediate member 7 is in its full right-hand position, the pawls 11″ are in ratchetting position with respect to the clutch teeth 5, so that upon resumption of forward rotation (with the control sleeve 12 in the unlocked position) one or more pawls 11″ is or are picked up by clutch teeth 5 and the intermediate member 7 is moved to the left, thereby bringing the clutch teeth 10 of the intermediate member 7 back into engagement with the clutch teeth 5, the intermediate member then being moved further to the left by the action of the clutch teeth 5 on the clutch teeth 10, until the position shown in Fig. 6 is reached in which the clutch teeth 10 are disengaged from the clutch teeth 5 and the pawls 11 are in ratchetting position.

In a modification of the last-described form of clutch, the auxiliary pawls 11″ are omitted and the intermediate member 7 is provided with a light spring which is compressed when the intermediate member moves beyond its position of toothed engagement adjacent to shoulder 8 and which urges the intermediate member axially into initial toothed engagement with its associated first clutch member when the input shaft 1 is again rotated in the forward direction.

In the above described embodiments of the invention the power of the engine is advantageously applied to the input shaft 1 through a turbo coupling of the variable filling type, e.g. of the type provided with an adjustable scoop tube the setting of which determines the degree of filling of the working circuit. In such cases, when the engine fuel controls has been closed to idling speed in preparation for change-over, the scoop tube of the turbo coupling is adjusted to reduce the filling of the working circuit. The scoop tube is adjusted to refill the working circuit after the brakes have been released and prior to the engine fuel admission being increased.

The turbo coupling may be provided, as described in the specification of United States patent application Serial No. 534,563, now Patent No. 2,882,683 dated April 21, 1959, with means whereby the pressure developed in the scoop tube system may be employed under the control of a valve to operate the scoop tube, and the back-turning mechanism BR1 and brake BR3 may be arranged to be operated by fluid pressure derived from the scoop tube system of the turbo coupling.

If the prime mover, instead of being an engine, is a gas turbine with a separate power turbine or a high pressure temperature steam turbine not suitable for developing power in a reverse direction of rotation, a turbo coupling is not employed, the output shaft of the power turbine being connected directly to the input shaft 1. In this arrangement the means for backward turning of the input shaft 1 may also constitute a slow motion turning gear of the type that is customarily provided for barring the rotor of such a turbine in the forward direction when not in operation. Such an arrangement is shown in Fig. 1, in which the back-turning mechanism BR1 comprises a friction clutch 38 capable of being operated to provide a driving connection to the input shaft 1 from a worm wheel 39 continuously driven in the backward direction of input shaft 1 by a worm gear 40 of a barring drive.

Preferably, the clutch controls in a turbine driven system are arranged so that the ahead clutch C2 can only move to the disengaged position when the astern clutch CL4 is locked in driving engagement, and vice versa, as indicated diagrammatically in Fig. 1.

In the event of the system being at rest with the clutches and controls in random settings, the gearing is brought into a condition for ahead or astern operation, as required, by applying the back-turning mechanism BR1 to turn the input shaft backwards with brake BR3 applied to hold the output shaft e.g. if rotating due to a tidal stream, whereby the clutches are brought into full toothed engagement for selective locking as required.

I claim:

1. A reversing power transmission system comprising an input shaft, an output shaft, an ahead power path and an astern power path between said input and output shafts, and two positive clutches, one in each of said power paths, selectively engageable to drivably connect said input shaft to said output shaft selectively via said ahead path and said astern path, the said clutches each being constructed and arranged with respect to said input shaft so that back-turning of said input shaft with said output shaft stationary effects helical movement of one clutch element relative to another clutch element of the clutch, locking control means for each of said clutches for selectively locking said clutches in the engaged condition, a brake for arresting said output shaft, and back-turning mechanism for said input shaft, the construction of said clutches with their locking control means being such that with the output shaft stopped and held against rotation by said brake and upon backward turning to a sufficient extent of said input shaft by said back-turning mechanism with said locking control means in clutch unlocking condition both said clutches execute a helical movement of said one clutch member relative to said other clutch member through a sufficient distance to permit selective locking of said clutches in preparation for the transmission of driving torque from said input shaft to said output shafe following release of said brake.

2. A reversing power transmission system according to claim 1, wherein each of the said clutches comprises a toothed first clutch member, a second clutch member and a toothed intermediate member constrained for helical movement relative to said second clutch member, and means for moving each intermediate member into toothed engagement with its associated first toothed clutch member when said input shaft is rotated backwards with said output shaft stationary at least one of the members comprising said intermediate member and said first clutch member being provided with co-acting teeth of an axial width such that upon operation of said back-turning mechanism to a sufficient extent the intermediate member of each clutch moves axially far enough, whilst remaining in toothed engagement with its associated first clutch member, to permit the intermediate member of the other clutch to move into toothed engagement with its associated first clutch member to permit of its being locked in engagement therewith.

3. A reversing power transmission system according to claim 1, wherein each of the said clutches comprises a toothed first clutch member, a second clutch member and a toothed intermediate member constrained for helical movement relative to said second clutch member, and means for moving each intermediate member into toothed engagement with its associated first toothed clutch member when said input shaft is rotated backwards with said output shaft stationary, and wherein the operation of said back-turning mechanism to a sufficient extent causes at least one of said intermediate members to move axially to a position in which it is out of engagement with its associated first clutch member, and means for effecting return of the disengaged intermediate member to toothed engagement with its associated first clutch member when the said input shaft is subsequently rotated in the normal driving direction.

References Cited in the file of this patent

UNITED STATES PATENTS

| | | |
|---|---|---|
| 1,175,101 | Werner | Mar. 14, 1916 |
| 1,233,178 | Budd | July 10, 1917 |
| 1,515,869 | Moyer | Nov. 18, 1924 |
| 1,693,645 | Fahrney | Dec. 4, 1928 |
| 2,618,988 | Woydt | Nov. 25, 1952 |
| 2,795,964 | Short | June 18, 1957 |
| 2,842,975 | Meyer et al. | July 15, 1958 |